LIQUID SOLVENT
PRIOR ART

LIQUID SOLVENT
GAS 3,799,857
ELECTROFILTER SYSTEM
Albert D. Franse, Houston, Tex., assignor to Petrolite Corporation, St. Louis, Mo.
Filed June 15, 1972, Ser. No. 263,044
Int. Cl. B03c 5/00, 5/02
U.S. Cl. 204—188                    20 Claims

ABSTRACT OF THE DISCLOSURE

An electrofilter system for removing solids from an organic liquid. The system comprises a vessel with an upright flow axis, inlet and outlet means for passing the organic liquid through a particulate bed residing in the vessel. The bed is formed of hard-granular, spheroidal particles of substantial uniformity in size and of a rigid and substantially incompressible dielectric material. The vessel has a void region above the bed to permit a substantial vertical expansion of the particles. An electric field within the bed has an intensity sufficient for removing solids from the organic liquid by their adhesion to the particles. The particles are periodically cleaned of adhering solids by means providing for (1) interruption of the electric fields, (2) expansion of the particles into the void region, and (3) induction of particles into a circular movement relative to one another, and then (4) removal of the released solids from the vessel.

BACKGROUND OF THE INVENTION (1) Field of the invention

This invention relates to the removal of solids from organic liquids by using electric fields; and more particular, it relates to the removal of such solids by their deposition upon a particulate bed under the action of high-voltage electric fields.

(2) Description of the prior art

Suspended solids can be removed from a nonconducting organic liquid passing through a filter mass subjected to a high-intensity, electric field. Equipment for this purpose is known as an electrofilter. In the electrofilter, the filter mass provides a porous matrix structurally contained by energized electrodes. The resultant electric field must be of a sufficiently high intensity within the filter mass that the solids are tenaciously attached to the solid surfaces of the porous matrix. Eventually, sufficient amounts of solids accumulate to make unsatisfactory the operation of the electrofilter. The most popular type of electrofilter employs a porous filter mass securely positioned within a vessel. This electrofilter is arranged so that the solid particles are held within the pore spaces of the filter mass under the action of the electric field. The filter mass may be any fibrous material such as glass or rock wool, synthetic plastic fibers, and like filamentary material. Alternatively, the filter mass may be porous material such as polyurethane foam. Other non-particulate, open-form materials have been employed as the filter mass. Electrofilters of this construction are very difficult to clean of accumulated solids. Generally, inplace solvent washings of these electrofilters does not return them to acceptable performance. Electrofilters have been employed which utilize a particulate material arranged into a bed in such a manner that the organic liquid traverses the filter mass under the influence of an electric field. Generally, the particulate bed electrofilter employs the bed within a relatively fixed position. As a result, the particulate material is held against movement during operation of solids removal and also during regeneration. In many cases, the electrofilter cannot be regenerated due to this fixed bed construction.

The solids adhering to the filter masses of an electrofilter are held so tenaciously that they not only fill the available pore spaces, but are held to adjacent solid surfaces by great forces. These adhering solids usually cannot be removed without disassembly of the electrofilter system. Then, the filter mass is cleaned separately and apart from the remaining electrofilter elements. For example, the porous synthetic foam is removed from an electrofilter, and then washed separately with solvents for removing the adhering solids. The particulate bed electrofilters are most easily cleaned of accumulated solids by first removing the particulate material and subjected it to solvent washing.

It had been proposed to backwash the particulated bed electrofilters with high velocity flows of a liquid solvent upwardly directed through the bed. As a result, the solvent causes a forced upward movement of the particulate bed, or a substantial portion thereof. The displaced particles are unstable and periodically fall downwardly into the mass of the bed. This "slugging" phenomena usually occurs at a high frequency, e.g., one cycle per second. Alternatively, the liquid solvent can be injected upwardly thorugh the bed at a relatively high "jet" velocity. This cleaning action produces "sprouting" which is a central upward movement of a small portion of the particulate materials in the bed. Then, the displaced materials slowly fall into the surrounding bed annulus about the jet flow. Attempts to clean the particulate bed electrofilter by "slugging" or "sprouting" flow of injected liquid solvent have not been successful. The adhesion of the solids to the particulate material is so tenacious that such types of liquid solvent washings cannot remove sufficient amounts of the solids to rejuvenate the effectiveness of the electrofilter. These cleaning techniques are so cumbersome that usually the electrofilter filter mass is discarded and replaced with a new quantity of the filter mass material.

In recent years, there has been developed a technique which is described in U.S. Pat. 3,394,067, for restoring the porous filter mass of an electrofilter system into acceptable operation by the removal of substantial quantities of adhering solids. In this method, the solids-containing filter mass is cleaned in place by creating a hydraulic disturbance of sufficient intensity to loosen the deposits which are then flushed from the porous mass by the fluid creating the disturbance. For this purpose, a liquid is flowed through the solids-containing porous filter mass while it is in place within the electrofilter. A change of a process condition concerning the liquid flow causes the sudden introduction of a gas phase within the porous filter medium. As a result, high turbulence flow conditions (similar to a water-hammer effect) are produce to loosen the deposited solids from the pores of the filter mass material. Preferably, gas is dissolved within carrier liquid and the resulting mixture is passed into the electrofilter. A pressure reduction causes separation of the gas phase with a sudden fluid-surging condition being created in the filter mass. However, this cleaning function does not rearrange the matrix or pore pattern of the filter mass. These cleaning conditions remove the most tenaciously held solids from the porous matrix of the filter mass and then carry it from the electrofilter system. This exceptional method is extremely effective for inplace cleaning of an electrofilter.

The present invention is related to the described patented method. In particular, it is applicable to an electrofilter system having a bed formed of spheroidal particles which form the electrified filtering mass. However, these particles are not held rigidly in place within the electrofilter. The particles are cleaned periodically by induced circular movements within the vessel forming the electrofilter in such a manner that not only are the tenaciously adhering solids removed from the surfaces of the particles

SUMMARY OF THE INVENTION

In accordance with this invention, there is provided an electrofilter system with a particulate bed for removing solids from an organic liquid and adapted for periodic cleaning of accumulated solids from such bed for the restoration of the electrofilter system to a condition for further removal of solids. The electrofilter system has a vessel with an upright flow axis, and carries inlet and outlet means for passing an organic liquid stream through the vessel. The vessel contains a bed of hard-granular spheroidal particles. These particles are substantially uniform in size and formed of a rigid, substantially incompressible dielectric material. A void region resides in the vessel above the bed to permit a substantial vertical expansion of the spheroidal particles. Means establish an electric field within the bed of an intensity sufficient for removing solids from the organic liquid stream by promoting adhesion of these solids on the spheroidal particles. Other means provide for periodically cleaning the spheroidal particles of the adhering solids by interruption of the electric field, expansion of the spheroidal particles of the bed into the void region, induction of circular movement of the spheroidal particles relative to one another, and removal of the released solids from the vessel.

DESCRIPTION OF SPECIFIC EMBODIMENTS

Figure 1:
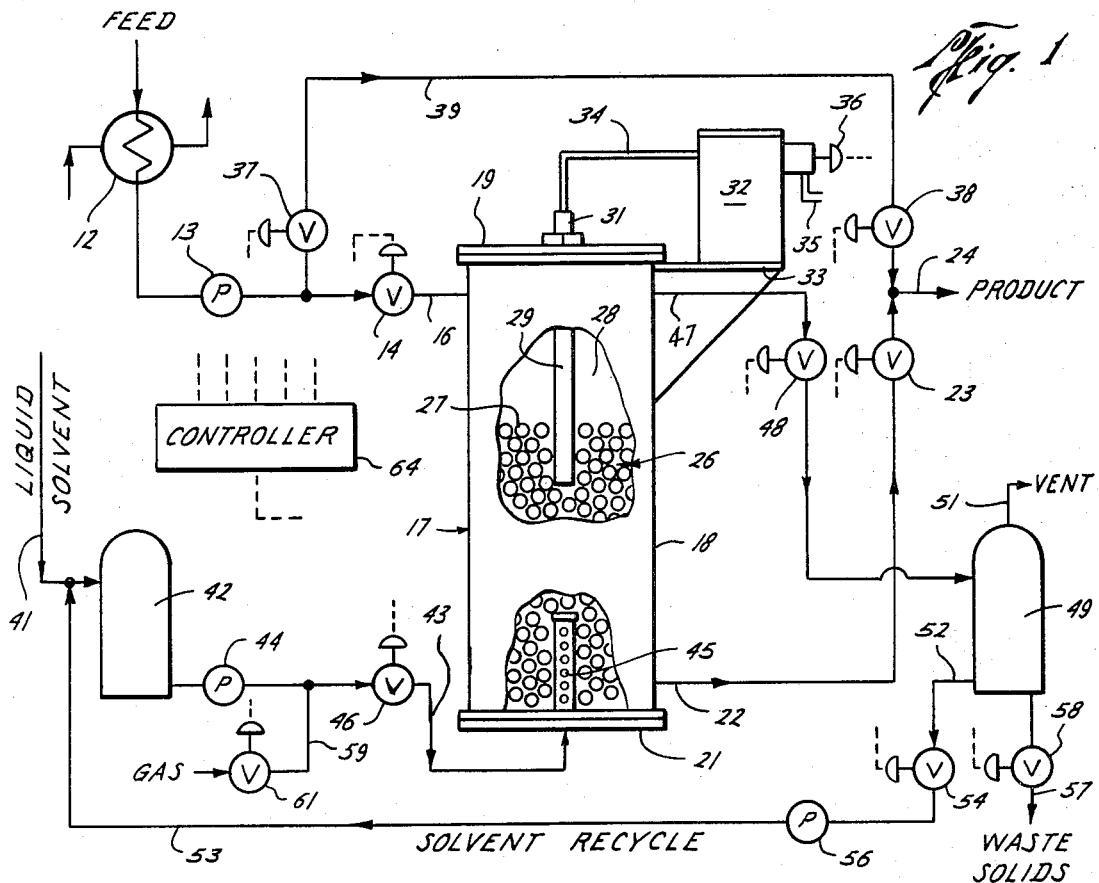
FIG. 1 is a perspective view, partially in vertical section, of an electrofilter system of the present invention arranged for removing solids from an organic liquid stream.

Referring now to FIG. 1, there is shown an electrofilter system of the present invention which may be employed for removing solids from an organic liquid in a commercial environment such as may be found in an oil refinery. The organic liquid may be any material having a high electrical resistivity and that also may be generally categorized as a dielectric fluid. For example, the organic liquid will usually be a hydrocarbon material such as crude oil and its products including, but not limited to, various refinery stream products, jet fuel, kerosenes, and catalytic process feedstocks. Generally, these organic liquids carry with them solids that may be undesirable materials when these liquids are subsequently processed. Most commonly, these solids are metallic compounds such as, rust (iron oxide), etc. Storage and transfer of hydrocarbons in processing equipment, may introduce nonmetallic materials, such as, particles of carbon, filaments of vegetable or organic origin, etc. In many instances, it is most desirable that these solids be removed from the organic liquid. Mechanical filtration can be employed for removing these solids from the organic liquid. However, it has been found that in the processing of crude oil into its various products, the contaminate solids are of very small sizes from less than one micron to 100 microns in average diameter. Usually, the particle size distribution of these solids is of a relatively small range of particle sizes. Stated in another manner, the 15 and 85 percentile distribution of these particles may range from between 1 and 10 microns in diameter. Commonly, the analysis of the solid content of these organic liquids requires their entrapment upon special 0.45 micron filters which remove all solids larger than this size from the liquid. In many cases, the larger sizes of the removed solids can be distinguished only by the use of microscopes with high magnification powers.

Electrofilters are well adapted to remove such very fine solids from organic liquids. However, these solids adhere very tenaciously to the filter mass in which the electric field is established for their removal from the organic liquid. The high efficiency of removal of these solids by the electrofilter therefore creates directly the problem of removing these solids from the filter mass of the electrofilter in order to restore useful operation. Otherwise, the efficiency of the electrofilter decreases as the solids accumulate within the pore spaces of the filter mass and can create a short circuit condition within the electric field impressed upon the filter mass.

For purposes of describing the present system, the organic liquid processed in the electrofilter system of FIG. 1 may be considered to be the oil refinery stream which is processed as the feed for a catalytic hydrodesulfurization unit. This organic liquid stream is a relatively heavy oil which is handled at high temperatures. It usually contains relatively large amounts of very small sizes of solids (which may be iron oxide) having a 15 and 85 percentile particle sizes distribution between one and ten microns. This stream is passed from any suitable source into a heat exchanger 12 where its temperature is adjusted to facilitate its treatment. Generally, the organic liquid should have a viscosity of about 1 centipoise for proper processing within the electrofilter. The organic liquid is moved by a pump 13 through a motor-control valve 14 into the inlet 16 of the electrofilter 17. The electrofilter 17 is formed of a metal cylindrical vessel 18 whose upper and lower extremities are sealed by flange covers 19 and 21. The flange covers 19 and 21 may be secured in place by bolting. An outlet 22 is provided on the vessel 18 for removing the purified organic liquid which then passes the relatively solids free liquid through a motor-control valve 23 into a product line 24 for subsequent utilization. A bed 26 of the spheroidal particles 27 is provided within the vessel 18. The bed occupies a substantial portion of the internal volume of the vessel 18. The bed is usually of a capacity to provide a residence time of 1–2 minutes to the stream being treated, and of a cross-sectional area giving 7–10 g.p.m./sq. ft. A void region 28 resides between the flange cover 19 and the top surface of the bed 26. The void region 28 should have a volumetric capacity sufficient to permit a substantial vertical expansion of the spheroidal particles. Generally, the particles should be permitted to expand at least five percent by volume to permit suitable cleaning action to be produced as will be hereinafter described. Usually, the bed 26 need not be expanded above approximately 40% by volume into the void region 28.

The bed 26 is formed from a multitude of spherical particles 27. These particles should be of a hard-granular material which is substantially uniform in size. The term "speroidal" is intended to include oval particles having minor to major axes in ratios not exceeding 4 to 6. By the term "uniform in size" is meant particles whose size distribution are not greater than 2 to 1 in average diameter. In addition, these spheroidal particles should be rigid and of a substantially incompressible dielectric material. By "dielectric material," it is meant a material having a relatively high electrical resistivity and a dielectric constant approaching that of the organic liquid. The dielectric material for best results should have a dielectric constant generally below 8, and preferably it should be in the range of about 5 to 7. Stated in another manner, the particles should be of a dielectric material having relatively high resistivity compared to water. The dielectric properties of these particles provide a surface for efficient retention of the extracted solids in the electric field but also a surface for the complete and repeated release of the accumulated solids upon agitation of these particles (without the electric field) with a suitable wash liquid.

Any suitable solid dielectric material may be employed which has a strength not to be unduly crushed in the bed 26. For example, blast furnace slag from steel mills in a range of particle sizes between ⅛ and ½ inches (maximum dimension) may be employed. Similarly, a screened river gravel having dimensions between ½ and ¼ inch sizes (maximum dimension) may be employed. It is preferred to employ a spheroidal particle bed which has approximately between 30 and 40 percent voids. It has been found that such beds operate very efficiently in the removal of solids from organic liquids.

Preferably, the spheroidal particles are selected from glass beads having about a ¼ inch diameter. In particular, the ¼ inch diameter glass beads which are employed for propping formations during oil well stimulation techniques have found to be very useful in the present electrofilter system. These beads are specially prepared for use in propping formations during hydrofracing techniques because of exceptional physical characteristics. These special characteristics are provided by the rapid chilling of molten glass during the manufacture of these beads. The rapid chilling procedure forms a very tough, hard and and smooth skin about the glass particles. These particles have a compressive strength greatly in excess of 50,000 p.s.i. and a tensile strength above approximately 8,000 p.s.i. They are a commercial article, readily obtained from the Halliburton Company, of Duncan, Okla. Since the "skin" about these beads is very smooth, the adhering solids (without the electric field) can be easily and completely removed by a washing solvent. The "skin" is also very hard which resists scratches and the resulting reduction in the very high electrical resistance.

The electrofilter 17 is provided with a means for establishing an electric field within the bed 26. More particularly, this electric field has an intensity sufficient for removing solids from the organic liquid passing from the inlet 16 through the spheroidal particles 27 toward the outlet 22. The electric field causes these solids to adhere very tenaciously to the exterior surfaces of the particles 27. The electric field can be created by any suitable equipment of which there are many examples in the prior art. As illustrated in FIG. 1, the electric field may be provided by an energized rod electrode 29 which is supported upon an entrance bushing 31 contained in the cover 19. Preferably, the entrance bushing 31 is threaded through the cover 19 and integrally carries the electrode 29 coaxially disposed within but electrically isolated from the vessel 18. The electrode 29 may extend substantially throughout the bed 26. Preferably the electrode 26 extends only approximately between ⅓ and ½ of the depth of the bed 26. By this arrangement, the electrical current loading upon the electrical components associated with the electrode 29 is reduced but yet provides a high intensity electric field for acceptable solids removal over an extended period of time from the organic liquid.

The electrode 29 is energized from any suitable source of power such as a DC power pack 32. A shelf 33 secured to the metal sidewall of the vessel 18 supports the pack 32. The pack 32 is connected to a suitable primary power cable 35 which may be, for example, 440–volt AC primary circuits in a refinery and the like. The pack 32 is arranged to provide suitable energizing potentials to the electrode and interconnects by a high voltage cable 34 to the bushing 31 and electrode 29. Generally, the pack 32 provides energizing potentials between the electrode 29 and vessel 18 of magnitudes sufficient to create between 5 and 50 kilovolts per inch gradient across the particles 27 in the bed 26. For this purpose, the pack 32 provides energizing potentials of suitable elevated magnitude to provide the desired potential gradients within the bed 26 for removing the solids from the organic liquid which traverses the bed 26. The operation of the pack 32 may be controlled by a switch 36 whose operation is remotely controlled as is illustrated by a chain line.

The purified organic liquid is removed from the outlet 22 and passes to the product conduit 24 usually until one of two events occurs. The efficiency of the bed 26 may decrease to sufficient level by the accumulation of removed solids that unacceptable quantities of solids are carried in the purified organic liquid moving into the product conduit 24. Alternatively, sufficient solids may accumulate in the bed 26 under such conditions as to short circuit the electric field sufficiently that the purified organic liquid becomes unacceptable in solids content. At this time, the electrofilter 17 has reached the cleaning state requiring the removal of accumulated solids from the particles 27 in the bed 26. Now, the means within the system of the present electrofilter system are activated in the periodic cleaning of the spheroidal particles 27. For this purpose, the organic liquid going to the electrofilter 17 is bypassed by motor control valves 37 and 38 within a bypass conduit 39 into product conduit 24 and valves 14 and 23 are closed. Thus, the organic liquid is directed to the product conduit 24. If desired a second electrofilter, which may be identical to the electrofilter 17, can receive the flow of diverted organic liquid. Alternatively, the pump 13 can be shut down to terminate flow of the organic liquid to the electrofilter system. The electric field produced by the pack 32 is interrupted through the actuation of the switch 36. Thereafter, the spheroidal particles 27 can be expanded into the void region 28. A circular movement of the expanded spheroidal particles 27 within the vessel 18 and a circular movement of the individual spheroidal particles 27 relative to one another is now induced. These circulating movements and intimate contact between particles facilitates the wash liquid in removing the tenaciously adhering solids from the particles 27 and in transporting these loosened solids exteriorly of the vessel 18. The cleaning means may take any suitable form but preferably they are formed by the following elements which have been found to produce exceptional results in the periodic cleaning of the spheroidal particles 27 in the bed 26.

The spheroidal particles 27 are expanded into the void region 28 by an upward flow of a relatively clean and solids-free liquid. The clean liquid may be the purified organic liquid from the product conduit 24. Preferably, the clean liquid is a hydrocarbon solvent contained in a closed cycle system. In this arrangement, the solvent may be repeatedly reused for the removal of solids. The solvent may be kerosene or naphtha having a low viscosity but relatively high solvent power for cleaning the spheroidal particles 27. The solvent is introduced into the closed cycle system through an inlet conduit 41 from any suitable source such as a refinery stream. The solvent is retained within a storage vessel 42 from which it is moved to an inlet conduit 43 by a pump 44 and then passes through a motor-control valve 46 into a distributor 45 in the lower portion of the electrofilter 17. Although the distribuor 45 can be of any design, exceptionally good results have been obtained with a coaxially mounted capped pipe containing a plurality of holes in its sidewall for directing fluid radially outwardly into the bed 26. The upward flow of the solvent through the bed 26 should be at a sufficient rate that the spheroidal particles 27 are expanded into the void region by at least 5 percent of their volume, and preferably, by a volumetric expansion in the range of between 30 and 35 percent. Generally, the bed 26 does not need to be expanded more than 40 percent of its volume into the void region 28 for acceptable results in the present cleaning operation. For example, an upward flow of kerosene in the amount of approximately 7 cubic feet per minute for each 100 pounds of spheroidal particles 27 within the electrofilter 17 is sufficient to expand the bed 26 by about 30 percent by volume. The solvent flows from the upper extremities of the vessel 18 through an outlet 47 and then passes through a motor-control valve 48 into a receiving tank 49. The receiving tank 49 is provided with a gas vent 51 and a return outlet 52 which connects through a recycle line 53 to the solvent inlet conduit 41 of the tank 42. The solvent recycle conduit 53 contains a motor-control valve 54 and a pump 56 for the moving of the solvent between the tanks 49 and 42. The tank 49 has a sufficient capacity to accumulate that small quantity of solvent required in one cycle of removing the solids from the spheroidal particles 27. The tank 49 can be provided with baffles, settling zones, etc., such that the solids settle to its lower extremities during continuous cleaning operation. These solids are removed through a waste solids outlet 57 whose operation is controlled through a motor-control valve 58. The mere passage of the solvent through the expanded bed 26 does not produce adequate cleaning of the spheroidal particles 27 of the tenaciously adhering solids. In accordance with this electrofilter system, a quantity of a gas, such as nitrogen, natural gas, or other gas acceptable within the environment of the bed 26 without creating injurious conditions, is introduced into the solvent entering the bed 26. For this purpose, a suitable source introduces a flow of gas into a gas inlet 59 under the controlled operations provided by motor-control valve 61. The gas intermingles with the solvent entering the inlet 43 of the electrofilter 17. The amount of gas introduced into the solvent is not large. Generally, the gas introduced will be that amount which produces an additional four to five percent volume expansion of the bed 26 into the void region 28. It has been found that usually one to two s.c.f.m. of gas for each approximate seven cubic feet per minute of solvent is required for good cleaning purposes.

The addition of this certain amount of gas into the solvent produces a phenomenal change in the cleaning environment of the spheroidal particles 27. Namely, the addition of this amount of gas produces an unique circulating bed condition within the electrofilter 17. By "circulating bed condition" is meant that the spheroidal particles 27 are slowly moving in a general circular or spheroidal movement within the vessel 18 and each particle 27 has a circular movement relative to its neighbor at moderate velocities but with very intimate contact. The particles 27 constantly contact one another and the walls of the vessel 18 in a thorough washing action which quickly removes the adhering solids from the surfaces of these particles. In addition, the gas phase within the solvent provides a second unique function which resembles the production of a froth in air flotation operations. The removed solids are gathered into a froth which assists them in their upward passage through the bed 26 and the void region 28 and then outwardly through the outlet 47 into the solvent storage tank 49. The gas phase quickly separates from the liquid phase in the tank 49 and escapes through the vent 51 to a suitable disposal or recovery system. The solids settle relatively quickly from the solvent within the tank 49. The solids can be periodically or continuously removed with a portion of the waste solvent stream in conduit 57 by operation of the valve 58. These solids may be passed through a recovery system for producing dry solids capable of being landfilled and a recovered solvent phase which may be returned into the inlet 41 for storage in the tank 42. The relatively clean solvent from the tank 49 is returned through the recycle line 52 into the tank 42 as is needed during operation of the present electrofilter system. Generally, only a few minutes of time is required for the expanded bed cleaning action of the present system to restore the spheroidal particles 27 to their proper operating state. Thus, the electrofilter 17 can be operated in the present electrofilter system for an extended period of time, as for example 36-50 hours duration, and then placed upon a cleaning cycle which may be, for example, 30 minutes in duration. At the end of the cleaning cycle the pumps 44 and 56 are shut down, the valves 37, 38, 46 and 48 are closed, and then the flow of organic liquid is established through the electrofilter by actuation of the pump 13 and opening valves 14 and 23. At this time, the remote control switch 36 actuates the power pack 32 into operation with establishment of the electric field within the bed 26. Thus, the bed 26 operates for extended periods of time in removing solids from organic liquid with only a short periodic cleaning cycle. This is one of the principal advantages of the present electrofilter system which has overcome the great difficulties in properly cleaning the filter mass of adhering solids in the electrofilter. For example, this unique cleaning cycle in the present electrofilter system removes solids from these particles to the same extent that could be obtained by hand cleaning of individual particles. Laboratory experiments have proved the outstanding result of this cleaning arrangement.

In order to visually observe the cleaning cycle provided by the present electrofilter system, an upright plastic column of a cylindrical section of acrylic plastic seven inches in diameter and 42 inches tall was prepared for the experiment. The 7-inch diameter vessel was filled with ¼ inch glass beads to a depth of 22 inches which gave a bead volume of approximately 836 cubic inches. Liquid solvent, which was commercial kerosene, was then passed at 280 inches per minute of superficial velocity upwardly through the bead pack to fluidize it. This solvent flow was at an equivalent rate of 47 g.p.m. A 27 percent expansion was obtained within the bead pack with the inlet distributor carried axially at the bottom of the vessel. Without the injection of gas, the movement became unstable in the flowing liquid. Then, the beads would suddenly fall downwardly into the remaining mass of beads. This slugging flow periodically occurred at a relatively high frequency, e.g., one cycle per second. Excessively high fluid velocities produced "sprouting" flow conditions where a central upward jet at high velocity displaced beads upwardly along the longitudinal axis in the vessel. The raised beads would then rain downwardly at much slower rates in the surrounding annulus in the vesesl about the jet flow. Neither of these "slugging" or "sprouting" flow conditions within the bed produced by upward liquid flow gave an acceptable cleaning of the beads.

Figure 2:
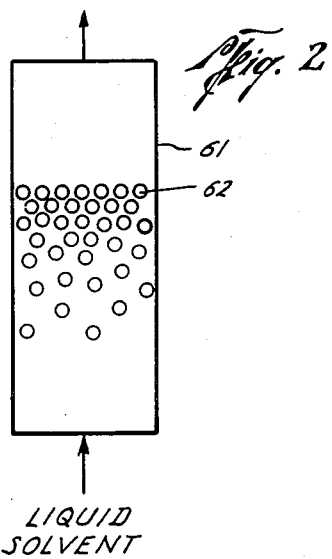
FIG. 2 is a graphic illustration of a prior art technique of using a high velocity liquid flow system in "slugging" flow to remove adhering solids from the particles forming the bed of an electrofilter.

Referring to FIG. 2, this condition "slugging" flow is shown diagrammatically in the upright vesesl as visually observed in the tests. A bed of spheroidal particles 62 has been displaced upwardly by a high rate of liquid solvent flow. The upper portion of the spheroidal particles 62 accumulated in a rather dense mass. However, the lower portion of the mass was a reltaively loose agglomeration of beads 62. This observed phenomena in the laboratory experiment resembled the stringing out of lead shot from a shotgun some distance from the nuzzle of the weapon. Periodically, the mass of beads 62 became unstable and the mass fell at a relatively high rate to the bottom of the vesesl 61. Then, the "slugging" flow cycle was repeated. The beads from the experiment associated with FIG. 2 were yet covered with a partial coating of solids which for practical purposes would prevent their being utilized within an electrofilter.

Figure 3:
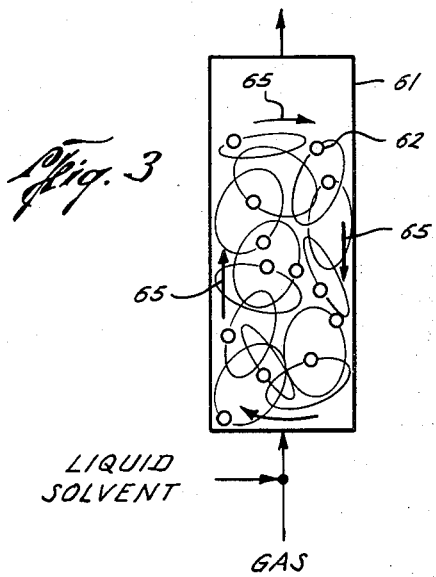
FIG. 3 is a like diagrammatic illustration of the system in FIG. 1 for removing adhering solids from the particles forming the bed of the electrofilter by induced circulatory motion of these particles relative to one another.

In the next experiment, a small quantity of nitrogen gas was introduced into the vessel 61. The diagrammatic results of visual observations are illustrated in FIG. 3. The gas was introduced in an amount to produce approximately a five percent increase in bed expansion in addition to the 27 percent expansion obtained solely with liquid solvent flow. Particularly, approximately 1.2 s.c.f.m. of nitrogen was required for 47 g.p.m. flow of kerosene through the vessel 61. The change in the movement of the beads 62 was remarkable in that it immediately produced the unique circulating flow bed condition. The beads 62 now moved in a general circular or spheroidal path (indicated by arrows 65) within the vessel 61, and in addition, each bead moved in a short circular or torodial path relative to the next adjacent one. Intimate contact between the beads and the vessel wall was obtained which quickly removed the adhering solids from the surfaces of these beads. The injected gas produced multides of tiny gas bubbles upon the particles 27 which appear to create constantly changing particle-gas-liquid interfaces that provide the major scrubbing action to remove the adhering solids from the particles. A substantial amount of water can be combined with, absorbed or otherwise carried by these solids which makes these solids highly conductive to electrical currents. This scrubbing action also removes any water films and droplets adhering to the particles 27. As a result, this novel cleaning function is capable of removing concurrently both solids and water from the particles 27. The gas phase also produces a froth-like condition in gathering the loosened solids. The froth was quickly carried upwardly with the liquid solvent flowing from the vessel 61. Only a few minutes (about 5 minutes) of this unique circulating bed cleaning action was required for the beads to be restored to a cleaning condition ready for operation within the electrofilter ssytem for removing additional amounts of solids from the organic liquid under the influence of high intensity electric fields. The action of the system described in association with FIG. 3 produced beads which were cleaned to the same extent as a scrupulous cleaning of the beads could be produced by thorough hand washing conditions. Thus, a short cleaning cycle by the present electrofilter system restored the beads to a clean condition which could permit the electrofilter 17 to be operated again for extended periods of time.

Field testing of the electrofilter 17 proved that very small solids, in the nature of iron oxides and iron sulfide particles, could be removed from a relatively heavy oil (atmospheric tower bottoms) within a refinery. Mechanical filtering cannot effect the removal of sufficient solids of the small size range distribution to prevent plugging problems in subsequent catalytic desulfurization units. These solids had particle sizes generally below ten microns in size. These solids had sizes between one and ten microns residing between the 15 and 85 percentile distribution. The electrofilter 17 operated at DC gradients ten to fifteen kilovolts per inch continuously for periods up to 235 hours with a maximum removal of 85 percent of the solids from the atmospheric tower bottom stream. The average solids removal was approximately 55 percent of total solids. It will be appreciated that this action is relatively phenomenal since the use of mechanical filters on such streams not only do not remove a substantial portion of the solids but require continuous regeneration cycles consuming excess quantities of wash liquids to restore them to operation at acceptable pressure drops.

The electrofilter system illustrated in FIG. 1 is readily adapted to the periodic cleaning operations through the use of a controller 64 which is connected to the various motor-control valves and control switch 36 through interconnections indicated by chain lines. The controller 64 may be of any suitable design but preferably is a pneumatic signal type controller such as may be obtained in the marketplace under the name Autocater Alarm System. This system provides (on a preset time or in response to a control signal) a plurality of signals for operating the motor-control valves and switch 36 in the desired sequence in the present electrofilter system. Of course, these valves and control switch 36 may be operated manually. An automatic control sequencing such as provided by the controller 64 is much more advantageous and insures trouble-free operation with a minimum of operator time.

From the foregoing, it will be apparent that there has been provided an electrofilter system well adapted for the removal of solids from organic liquid streams. In particular, the system can be operated continuously for extended periods of time with only a short period of cleaning cycle. It will be understood that certain features and alterations of the present system may be employed without departing from the spirit of this invention. This is contemplated by and is within the scope of the appended claims. Additionally, it is intended that the present description is to be taken as an illustration of the present system.

What is claimed is:

1. A particulate bed electrofilter system for removing solids from an organic liquid stream comprising:
   (a) a vessel having an upright flow axis and carrying inlet and outlet means for passing an organic liquid stream through said vessel;
   (b) said vessel containing a bed of hard granular spheroidal particles, said particles being substantially uniform in size and of a rigid and substantially incompressible dielectric material;
   (c) said vessel having a void region above said bed to permit a substantial vertical expansion of said spheroidal particles;
   (d) means for establishing an electrical field within said bed of an intensity sufficient for removing solids from the organic liquid stream by adhesion of the solids on said spheroidal particles; and
   (e) means for periodically cleaning said spheroidal particles of adhering solids by interruption of said electrical field, expansion of said spheroidal particles of said bed into said void region, induced circular movement of said spheroidal particles relative to one another and removal of the released solids from said vessel.

2. The electrofilter system of claim 1 wherein said void region has a volumetric capacity to receive between from about 5 to about 40 percent by volume of said spheroidal particles.

3. The electrofilter system of claim 1 wherein said means for periodically cleaning said spheroidal particles include pump means for passing a wash liquid upwardly through said bed at a flow rate capacity for expanding said spheroidal particles by at least about 5 percent by volume into said void region, and gas source means for introducing gas flow into the wash liquid passing through said bed to produce an additional volumetric expansion of at least four percent by volume into said void region whereby said spheroidal particles are moved in closed curve paths with the released solids forming a froth removed from said bed by the upward flowing liquid and gas mixture.

4. The electrofilter system of claim 1 wherein said means for establishing an electrical field within said bed include a source of high potential current, an entrance bushing mounted coaxially at the top of said vessel, a rod electrode depending from said bushing and said rod electrode extending into said bed of spheroidal particles, and conductor means for applying the high potential current to said bushing for energizing said electrode and a second electrode disposed circumferentially about said bed.

5. The electrofilter system of claim 1 wherein said spheroidal particles are like-sized glass beads with a diameter residing between one-eighth and one-half inch.

6. The electrofilter system of claim 5 wherein said glass beads have a diameter of about one-quarter inch.

7. The electrofilter system of claim 4 wherein said rod electrode extends downwardly into said bed to between about one-third and one-half the depth of said spheroidal particles within said vessel.

8. The electrofilter system of claim 1 wherein said means for establishing an electrical field produces a DC potential in said bed of between 5 and 50 kilovolts per inch across said spheroidal particles between said rod electrode and second electrode.

9. The electrofilter system of claim 1 wherein said spheroidal particles are one-quarter inch diameter glass beads having a compressive strength of about 50,000 p.s.i. and a tensile strength above about 8,000 p.s.i.

10. The electrofilter system of claim 1 wherein said means for periodically cleaning said spheroidal particles are programmed for periods of removing solids from the organic liquid with intervening periods of cleaning said spheroidal particles.

11. The electrofilter system of claim 1 wherein said means for periodically cleaning said spheroidal particles include pump means for passing a wash liquid which includes a small amount of gas upwardly through said bed at a flow rate providing an upward superficial velocity of at least 280 inches per minute for expanding said spheroidal particles into said void region whereby said spheroidal particles are moved in closed curve paths with the released solids forming a froth removed from said bed by the upward flowing liquid and gas mixture.

12. A process for the removal of solids from an organic liquid stream comprising:

(a) passing the solids-containing organic liquid stream along an upright flow axis in an electrofilter having a porous bed, said porous bed being formed of hard substantially uniform in size and of a rigid and substantially incompressible dielectric material;

(b) establishing an electric field within said porous bed traversed by said stream and said electric field having an intensity of at least 5 kilovolts per inch of DC potential whereby solids are removed from said stream by their tenacious adhesion to said spheroidal particles;

(c) removing the stream with a reduced solids content to a subsequent utilization; and (d) periodically cleaning said spheroidal particle of the accumulated solids to restore the solids-removal efficiency of said porous bed by interrupting said electric field, expanding said spheroidal particles by at least 5 percent by volume, inducing circular movement of said spheroidal particles within said electrofilter and relative to one another, and removing said released solids from said electrofilter.

13. The process of claim 12 wherein said periodic cleaning of said spheroidal particles includes:

(a) terminating the flow of said stream through said porous bed, (b) discontinuing said electric field within said porous bed when said stream flow is terminated, (c) passing a wash liquid upwardly through said porous bed at a flow rate sufficient to expand same in an amount of at least 5 percent by volume, and (d) introducing into said wash liquid of a small amount of gas sufficient to expand said porous bed by about an additional 5 percent by volume, whereby said spheroidal particles follow a circular course within said porous bed in its expanded state and the individual spheroidal particles are induced into continuous circular movements relative to one another with extreme intimate contacting for efficient loosening of the adhering solids which are removed in a froth-like condition by the upward fluid flow from said porous bed.

14. The process of claim 13 wherein said wash liquid is a hydrocarbon distillate.

15. The process of claim 14 wherein said gas is nitrogen.

16. The process of claim 13 wherein said wash liquid is passed upwardly through said porous bed at a superficial velocity of about 280 inches per minute through said spheroidal particles.

17. The process of claim 12 wherein said organic liquid stream contains inorganic iron compounds as solids.

18. The process of claim 12 wherein said spheroidal particles are round glass beads.

19. The process of claim 18 wherein said glass beads have a diameter of about one-quarter inch.

20. The process of claim 13 wherein said solids removed from said spheroidal particles are separated from said wash liquid and gas, and the clarified wash liquid is recycled into subsequent periodic cleaning of said porous bed.

References Cited
UNITED STATES PATENTS

| | | | |
|---|---|---|---|
| 2,573,967 | 11/1951 | Hamlin | 204—184 |
| 3,394,067 | 7/1968 | Shirley | 204—180 R |
| 3,190,827 | 6/1965 | Kok et al. | 204—302 |
| 2,534,907 | 12/1950 | Ham et al. | 204—188 |
| 2,136,660 | 11/1938 | Martin | 210—80 |
| 1,406,340 | 2/1922 | Brown | 210—80 |

JOHN H. MACK, Primary Examiner

T. TUFARIELLO, Assistant Examiner

U.S. Cl. X.R.

204—307

UNITED STATES PATENT OFFICE
CERTIFICATE OF CORRECTION

Patent No. 3,799,857                     Dated    March 26, 1974

Inventor(s)   A. D. Franse

It is certified that error appears in the above-identified patent and that said Letters Patent are hereby corrected as shown below:

Column 2, line 12, for "subjected", read +++subjecting+++;
         line 23, for "thorugh", read +++through+++;

Column 5, line 48, for "electrode 26", read +++electrode 29+++;

Column 8, line 37, for "vesesl", read +++vessel+++;
         line 42, for "reltaively", read +++relatively+++;
         line 44, for "nuzzle", read +++muzzle+++;
         line 69, for "multides", read +++multitudes+++;

Column 9, line 11, for "ssytem", read +++system+++;

Column 11, line 11, after "hard", insert +++granular spheroidal particles which particles are+++; and
         line 22, for "particle", read +++particles+++.

Signed and sealed this 30th day of July 1974.

(SEAL)
Attest:

McCOY M. GIBSON, JR.              C. MARSHALL DANN
Attesting Officer                 Commissioner of Patents